United States Patent
Cox

[11] B 3,982,085
[45] Sept. 21, 1976

[54] STOCK SENSING DEVICE

[75] Inventor: Joseph Henry Cox, Cincinnati, Ohio

[73] Assignee: Cincinnati Milacron, Inc., Cincinnati, Ohio

[22] Filed: Sept. 16, 1974

[21] Appl. No.: 506,286

[44] Published under the second Trial Voluntary Protest Program on January 20, 1976 as document No. B 506,286.

[52] U.S. Cl. .................. 200/61.41; 200/61.58 R
[51] Int. Cl.² .......................... H01H 3/16
[58] Field of Search ........ 200/61.4, 61.41, 61.58 R, 200/80 R, 81.9 R, 81.9 M

[56] References Cited
UNITED STATES PATENTS

| | | | |
|---|---|---|---|
| 3,187,128 | 6/1965 | Hammer | 200/80 R X |
| 3,424,883 | 1/1969 | Heskett | 200/81.9 R |
| 3,761,654 | 9/1973 | Davis | 200/61.58 R |

*Primary Examiner*—James R. Scott
*Attorney, Agent, or Firm*—Thomas M. Farrell

[57] ABSTRACT

An apparatus for sensing sufficient chucking stock in a rotating work-holding chuck having a self-contained circular plate assembly adapted to the face of the work-holding chuck, wherein a clearance bore is provided through the plate assembly to permit passage of machining stock and a radially movable indicator pin is provided within the plate assembly to detect the presence of machining stock within the clearance bore. The radially movable indicator pin will urge a trip plunger out of the circumferential surface of the plate assembly when no stock is present, and a limit switch will be tripped by the trip plunger to signal the absence of chucking stock.

5 Claims, 7 Drawing Figures

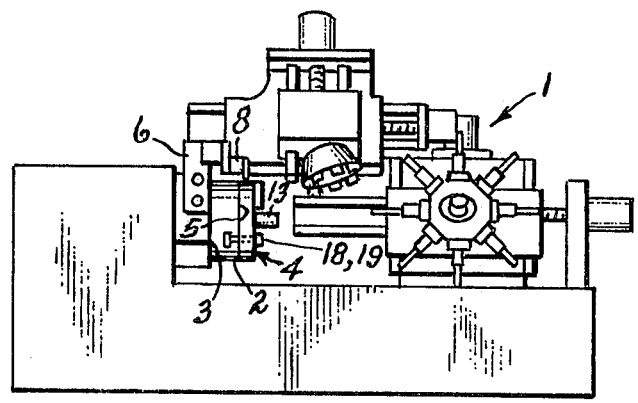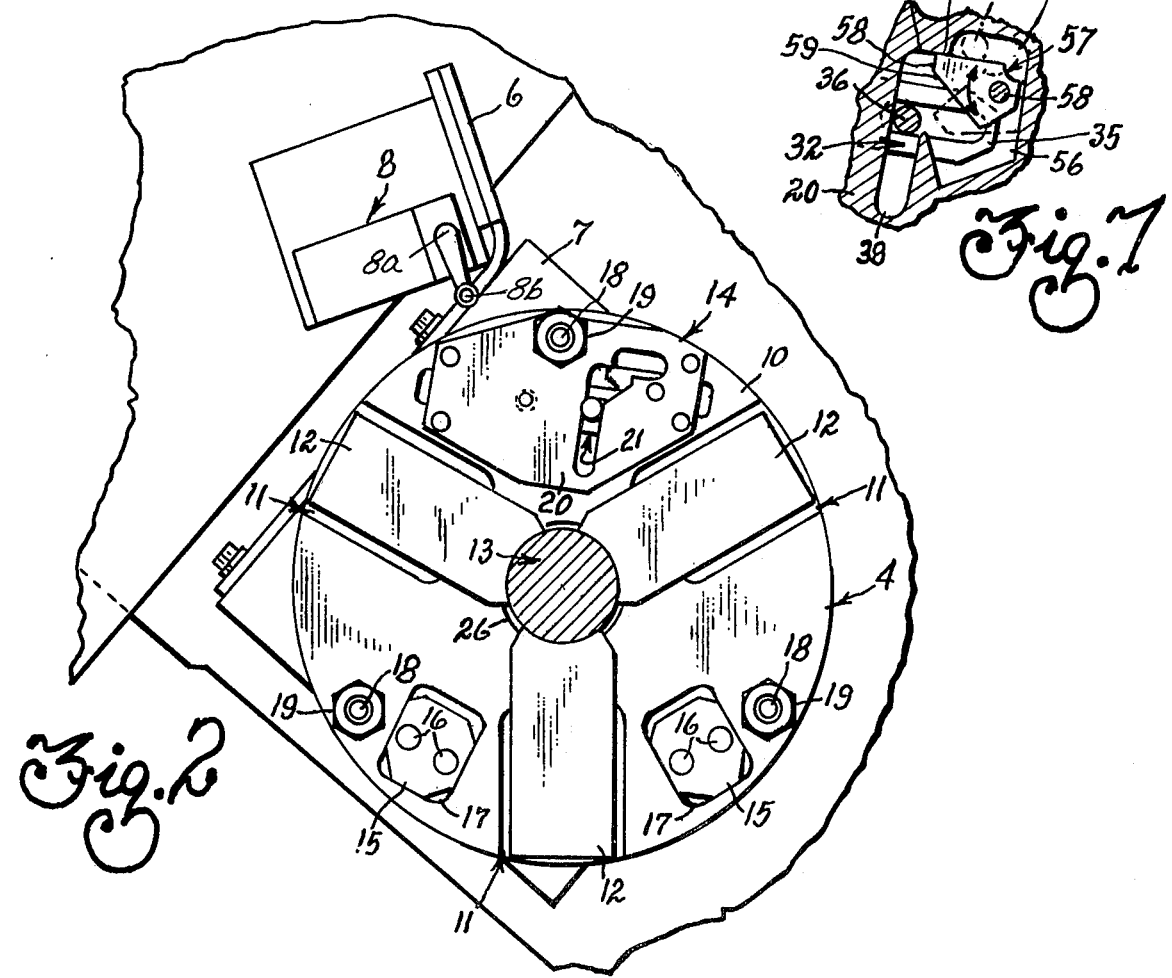

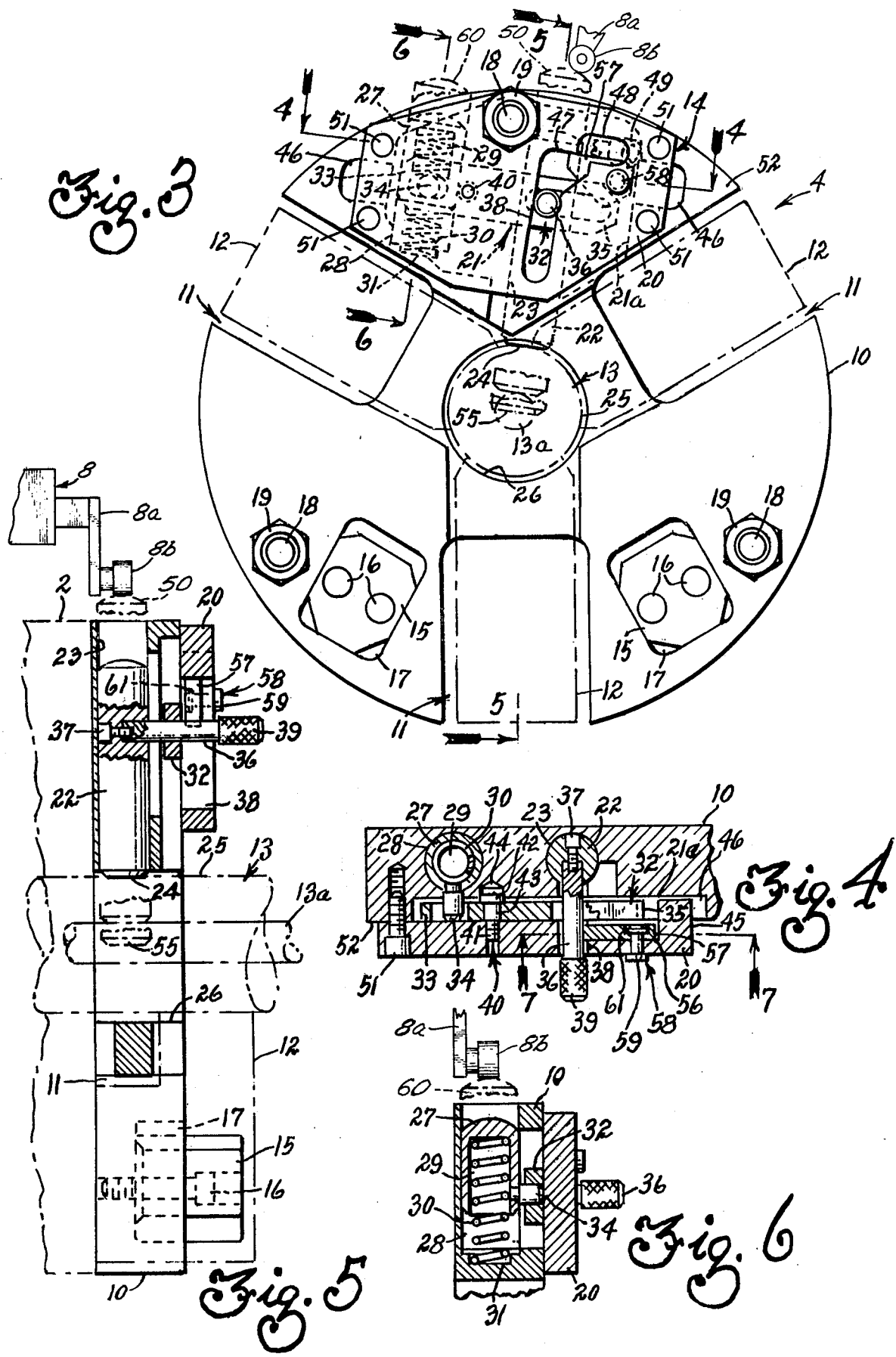

STOCK SENSING DEVICE

BACKGROUND OF THE INVENTION

This invention relates to work-holding chucks as used on automatic turning machines.

Automatic turning machines generally utilize long bars for work feed stock which extend through the spindle of the headstock of the machine; out of the front of the spindle, and through a work-holding chuck. As a workpiece is finish-machined and cut off from the parent bar stock, the grip of the work-holding chuck can be relaxed and the bar is fed outward to present new material for machining.

Many types of bar feeder attachments are used to increment stock through the work spindle. There are pushers, which urge the work stock forward from the rear of the headstock, and there are pull type attachments which grab the part and withdraw it from the front of the chuck.

After withdrawing additional stock through the chuck for the next successive machining operations, the chuck reclamps on the work stock and, at this time, it is imperative that there be sufficient clamping stock present within the clamping area. If there is insufficient clamping stock present within the clamping area, the chuck may not be operating at its proper design forces and may tend to have overstressed points, which could operate to the detriment of the chuck assembly and cause failure of the components.

For example, if a jaw type chuck is used for clamping the work stock and there is not sufficient stock to cover the clamping face of the jaws, high unit stresses will be developed over the zone of clamp, and high bending stresses may be developed in the jaw bodies as well. Since the jaws are normally subjected to great stresses because of the flyaway tendencies of centrifugal action, the internal stresses are compounded and may cause failure of the jaws.

Prior art devices for sensing the presence of stock to allow adequate clamping have also included cumbersome mechanical devices which reach through the headstock spindle and touch the end of the workpiece which, while necessary in purpose, are impractical to use in function. Similarly, stock feelers have been contained within a chuck body which necessitates having a complex chuck unit and feedback sensing control.

The apparatus of the within invention has obviated the need for these prior art stock sensing devices by providing a self-contained stock sensing device having only mechanical features adapted to the machine, and which is capable of being readily mounted to the front face of the work-holding chuck.

It is therefore an object of the present invention to provide a mechanical unit which may be fitted to the front face of the work-holding chuck for sensing the presence of sufficient work-holding stock.

Another object of the within invention is to provide a stock sensing device which is inexpensive and easily applied.

Still another object of the within invention is to provide a stock sensing device which may be applied to jaw type work-holding chucks wherein the sensing element may be applied to the stock in a location proximate to the jaw clamping zone.

SUMMARY OF THE INVENTION

This invention relates to a stock sensing device as used on a turning machine having a rotating chuck for holding a workpiece. The plate-like assembly is adapted to the front face of the work-holding chuck, and has an axial bore provided therethrough to permit passage of machining stock while an indicator pin is adapted to move radially within the body of the assembly to sense the presence or absence of sufficient clamping stock for the chuck jaws. A linkage is provided within the body of the stock sensing device to transmit movement of the indicator pin into movement of a trip plunger which, when stock is absent from the indicator pin face, will extend outward beyond the circumferential surface of the body of the stock sensing device and trip a limit switch to signal the absence of sufficient clamping stock for the chuck jaws.

BRIEF DESCRIPTION OF THE DRAWINGS

FIG. 1 is a front elevational view of a turning machine having a rotating work-holding chuck mounted to the spindle face.

FIG. 2 is a view looking into the front of a stock sensing assembly on a work-holding chuck.

FIG. 3 is a front view of a stock sensing plate assembly.

FIG. 4 is a section through a plunger assembly taken along the line 4—4 of FIG. 3.

FIG. 5 is a section through the stock sensing device taken along the line 5—5 of FIG. 3.

FIG. 6 is a section through a spring-loaded plunger taken along the line 6—6 of FIG. 3.

FIG. 7 is a section through a gate taken along the line 7—7 of FIG. 4.

DESCRIPTION OF THE PREFERRED EMBODIMENT

Referring now to the drawings and, in particular, FIG. 1 thereof, there is shown a turning machine 1 having a rotating work-holding chuck 2 mounted to the spindle face 3. A stock sensing assembly 4 is shown mounted to the face 5 of the work-holding chuck 2.

In FIG. 2 it is seen that a switch bracket 6 is mounted on the headstock 7 of the turning machine 1 and has, for signal means, mounted thereon a limit switch 8 capable of sensing movement of a switch arm 8a and arm roller 8b.

The enlarged front view of the stock sensing assembly 4 shown in FIG. 3 illustrates that the sensing assembly body 10 is basically a circular plate having relief portions 11 cut to provide clearance for chuck jaws 12 which reach from the work-holding chuck through the sensing plate assembly 4 thereafter to clamp the workpiece 13. A plunger assembly 14 is shown mounted to one portion of the sensing plate body 10, and counterweights 15 are secured to substantially opposite points on the sensing assembly body 10 by screws 16 and the counterweights 15 are located in machined slots 17. These counterweights 15 establish a balance for the stock assembly 4 to counteract any imbalance which may be secured by the plunger assembly 14. Tee bolts 18 and nuts 19 are provided to secure the stock sensing assembly 4 to the work-holding chuck face 5.

For mechanical means, the plunger assembly 14 is comprised of a plate 20 which covers a mechanism 21 within a machined-out relief cavity 21a in the sensing assembly 4. An indicator pin 22 is adapted for radial movement within a radial bore 23 of the body 10 and may move along a radial path where its inward end 24 touches on the external surface 25 of a workpiece 13 which may be passed through a clearance bore 26 in the sensing assembly body 10. A spring-loaded plunger 27 (shown in section in FIG. 6) is contained within a bore 28 in the body 10, and has a hole 29 within the plunger 27. A compression spring 30 is contained within the hole 29 and reacts against the bottom 31 of the bore 28. A lever 32 is pivotally mounted to the plate 20 near its midpoint and one end 33 of the lever 32 is slotted to receive a pin 34 projecting from the spring-loaded plunger 27, while the other end 35 of the lever 32 is slotted to allow passage of a lifting pin 36 extending from the indicator pin 22. The lifting pin 36 is secured to the indicator pin 22 by a screw 37 and extends through the lever 32 and through a guide slot 38 in the plunger assembly plate 20. The outer portion 39 of the lifting pin 36 is knurled to allow manual grasping of the pin 36.

The section shown in FIG. 4 illustrates that the plunger assembly plate 20 acts as a cover plate and also as a mount for pivoting the lever 32. The lever pivot pin 40 has a threaded portion 41 and a head 42 to captivate the lever 32 for pivotal rotation on a smooth fitting body diameter 43. A relief portion 44 is provided in the body 10 to allow clearance around the head 42 of the lever pivot pin 40. Lugs 45 are provided on the plate 20 to provide accurate positioning of the plunger assembly 14 and to secure the plate 20 against any centrifugal flyaway forces which may tend to throw the plate 20 while rotating the chuck 2. Complementary keyways 46 are provided for the lugs 45.

FIG. 4 further depicts a cavity 56 adjacent to the slot 38, in the plate 20. A gate 57 is located in the cavity 56 and adapted to pivot on a pivot pin 58 in a plane substantially normal to the lifting pin 36. The pivot pin 58 passes through the plate 20, and is captivated by a pin head 59 on one end and a retaining ring 61 on the other end, adjacent to the gate 57.

Referring now back to FIG. 3, it is seen that the main portion of the slot 38 in the plate 20, through which the lifting pin 36 extends, lies generally along a radial pathway so that the indicator pin 22 is free to slide in its radial bore 23. However, at the outermost end 47 of the slot a secondary portion 48 of the slot 38 is shown cut at an attitude substantially normal to the main portion of the slot 38. In this manner, when the chuck 2 is not rotating, the lifting pin 36 may be lifted up and flipped across into the secondary portion 48 of the slot 38 (the phantom lever position 49 shown in FIG. 3), and the indicator pin 22 will thus be prevented from moving back inwardly along its radial pathway. When locked in this position 49, no stock sensing within the body clearance bore 26 will take place, and the unit is generally rendered inoperable. When the lever 36 is locked in this position 49, the indicator pin 22 will reach to phantom position 50 and inhibit rotation of the assembly 4 by tripping the limit switch 8. A workpiece 13 may be then fed through the chuck 2 and other setups and procedures may be facilitated without interference from the indicator pin 22. Screws 51 are used to clamp the plate 20 to the face 52 of the body 10.

The section view in FIG. 5 further depicts the indicator pin 22 in its companion bore 23, contacting a workpiece 13. The lifting pin 36 is shown extending from the indicator pin 22 outward through the slot 38 in the cover plate 20. Chuck jaws 12 are shown reaching from the chuck body 2 through relief portions 11 provided in the stock sensing assembly 4 and the chuck jaws 12 are shown clamping the workpiece 13. Further, counterweights 15 are shown in their slots 17 and held secured to the sensing plate assembly by screws 16.

The indicator pin 22 is urged against successively smaller workpieces 13, 13(a), by action of the spring-loaded plunger 27. When no stock is present below the inward end 24 of the indicator pin 22, and the pin comes to its innermost position 55, the spring loaded plunger 27 rises to its topmost position 60, (shown in FIG. 6) and moves the roller 8b and arm 8a which trips the limit switch 8 to inhibit rotation for further machining operations.

The section shown in FIG. 7 is taken through the plate 20, illustrating the lifting pin 36 in its guide slot 38. The gate 57 is a generally rectangular plate, having a stop face 58 with an adjacent clearance miter 59, and a locating edge 60 to react on the end 47 of the guide slot 38. The gate 57 is shown resting against the outermost end 47 of the slot 38; a position resulting from the centrifugal force acting on the gate 57, causing it to pivot on the pin 58, while the chuck 2 is rotating. When the gate 57 is in the solid position shown, the lifting pin 36 is prevented from unwanted movement to the "lockout" phantom position 49 while the chuck 2 is rotating.

When the chuck 2 is stationary, and the gate 57 lies approximately along the short arc between "10 o'clock" and "2 o'clock" (when viewed in FIG. 3), the gate 57 will swing down under the force of gravity within its cavity 56, and the lifting pin 36 may be moved to the secondary portion 48 of the guide slot 38.

It is obvious that minor changes may be made in the form and construction of the invention without departing from the material, and spirit thereof. It is not, however, desired to confine the invention to the exact from herein shown and described, but it is desired to include all such as properly come within the scope claimed.

What is claimed is:

1. In a machine tool, having a rotating chuck with work gripping members for holding a workpiece being machined, an apparatus for sensing sufficient chucking stock comprising:
  a. a body, mounted to said rotating chuck, having its central axis coincident with the axis of rotation of said chuck;
  b. an axial bore through the central axis of said body, through which predetermined increments of stock are fed for successive machining operations;
  c. an indicator pin, slidably adapted in a radial bore in said body, and located within the dimensional range of the axial length of said work gripping members;
  d. mechanical means urging said indicator pin inwardly towards the central axis of said body such that said pin bears on the outer diameter surface of various work sizes when present in said axial bore, and said pin moves inward radially to said central axis of said body when no stock is present at the inwardly-directed end of said indicator pin, and further wherein said mechanical means can trip a stationary signal means when no stock is present beneath said inwardly-directed end of said indicator pin and while said chuck is rotating; and
  e. signal means mounted on said machine tool in a stationary position relative to said rotating chuck, wherein said signal means has a signal operator capable of engaging said mechanical means at a predetermined signal position while said body is rotating and said signal means is stationary.

2. The apparatus of claim 1, wherein said mechanical means comprises:
a. a spring-loaded plunger slidably maintained in said body;
b. a lever, one end of which is acted upon by said plunger and further wherein said lever is adapted to pivot from said action;
c. a pivot pin for rotatably supporting said lever;
d. a lifting pin, secured to said indicator pin and acted upon by the other end of said lever, such that plunger action in one direction causes a reverse force to be directed on said indicator pin; and
e. a guide plate, having a means to secure said pivot pin thereto, and a guide slot to control the path of said lifting pin.

3. The apparatus of claim 1, wherein said body comprises a circular plate having a plurality of relief portions therein for chuck jaws.

4. The apparatus of claim 1, further comprising a counterweight affixed to said body so as to substantially balance the mechanical means about the rotational axis.

5. The apparatus of claim 1, wherein said signal means comprises an electrical switch, and said signal operator comprises an arm and roller rotatably carried on said electrical switch so as to function as a switch operator.

* * * * *